(12) United States Patent
Okumura et al.

(10) Patent No.: US 7,604,755 B2
(45) Date of Patent: Oct. 20, 2009

(54) ELECTROCONDUCTIVE RESIN COMPOSITION AND SEPARATOR FOR FUEL CELL

(75) Inventors: Hiroya Okumura, Ashiya (JP); Keizo Kimura, Mino (JP); Shinji Tachibana, Sodegaura (JP); Takeshi Kusagaya, Shizuoka (JP)

(73) Assignee: Japan Composite Co., Ltd., Chuo-Ku, Tokyo (JP)

( * ) Notice: Subject to any disclaimer, the term of this patent is extended or adjusted under 35 U.S.C. 154(b) by 310 days.

(21) Appl. No.: 10/545,210

(22) PCT Filed: Feb. 13, 2004

(86) PCT No.: PCT/JP2004/001554

§ 371 (c)(1),
(2), (4) Date: May 22, 2006

(87) PCT Pub. No.: WO2004/072987

PCT Pub. Date: Aug. 26, 2004

(65) Prior Publication Data

US 2006/0240303 A1    Oct. 26, 2006

(30) Foreign Application Priority Data

Feb. 17, 2003    (JP)    ............... 2003-038846

(51) Int. Cl.
*H01B 1/00* (2006.01)
*H01B 1/24* (2006.01)
*H01M 2/00* (2006.01)
*H01M 2/02* (2006.01)

(52) U.S. Cl. ......................................... 252/511; 429/34

(58) Field of Classification Search ................. 252/500, 252/511; 429/34
See application file for complete search history.

(56) References Cited

U.S. PATENT DOCUMENTS

| | | | | |
|---|---|---|---|---|
| 3,373,075 A | * | 3/1968 | Fekete et al. | ................. 442/136 |
| 5,242,511 A | * | 9/1993 | Yokoyama et al. | ........... 148/430 |
| 6,248,467 B1 | * | 6/2001 | Wilson et al. | ................. 429/39 |
| 6,251,308 B1 | | 6/2001 | Butler | |
| 6,592,986 B1 | * | 7/2003 | Hakotani et al. | ............. 428/332 |
| 6,752,937 B2 | * | 6/2004 | Butler | ......................... 252/511 |
| 7,090,793 B2 | * | 8/2006 | Ma et al. | ...................... 264/105 |
| 2002/0020832 A1 | * | 2/2002 | Oka et al. | .................... 252/500 |
| 2002/0055030 A1 | * | 5/2002 | Okumura et al. | ............... 429/34 |
| 2002/0086198 A1 | * | 7/2002 | Ilno et al. | ...................... 429/34 |
| 2003/0054103 A1 | * | 3/2003 | Sato et al. | .................... 427/256 |
| 2004/0023120 A1 | * | 2/2004 | Nishikubo et al. | ........... 429/253 |

FOREIGN PATENT DOCUMENTS

| | | | |
|---|---|---|---|
| JP | 04-267062 A | | 9/1992 |
| JP | 10-334927 A | | 12/1998 |
| JP | 2001-151833 A | | 6/2001 |
| JP | 2002-105310 A | | 4/2002 |
| JP | 2002-164063 A | | 6/2002 |
| WO | WO 9961239 A1 | * | 12/1999 |

* cited by examiner

*Primary Examiner*—Mark Kopec
*Assistant Examiner*—Jaison P Thomas
(74) *Attorney, Agent, or Firm*—Buchanan Ingersoll & Rooney PC

(57) ABSTRACT

An electroconductive plate is prepared by molding an electroconductive resin composition comprising an electroconductive agent and a radical-polymerizable thermosetting resin system having an acid value in a specific range by a resin molding method. The electroconductive agent may be a carbon powder. The radical-polymerizable thermosetting resin system may comprise a radical-polymerizable resin and a radical-polymerizable diluent. The double bond equivalent of the radical-polymerizable resin is preferably about 200 to 1000. The glass transition temperature of the hardened product is preferably not lower than 120° C. The proportion (weight ratio) of the electroconductive agent relative to the radical-polymerizable thermosetting resin system [the former/the latter] is about 55/45 to 95/5.

17 Claims, No Drawings

ELECTROCONDUCTIVE RESIN COMPOSITION AND SEPARATOR FOR FUEL CELL

TECHNICAL FIELD

The present invention relates to an electroconductive resin composition useful as an electroconductive plate (e.g., a separator for a polymer electrolyte fuel cell), an electroconductive plate (e.g., a separator) formed from the resin composition, and a process for producing the plate.

BACKGROUND ART

A polymer electrolyte fuel cell (or a solid polymer fuel cell) comprises a solid polymer electrolytic membrane composed of an ion exchange membrane (a polymer membrane having ion conductivity) such as perfluorocarbonsulfonic acid in which a sulfonic acid group is introduced into a fluorocarbon skeleton (such as a polytetrafluoroethylene skeleton), two electrodes disposed on both sides of the electrolytic membrane, separators with grooves for supplying a gas such as hydrogen gas and oxygen gas to each electrode, and two current collectors disposed on both sides of these separators.

Among these constituting members, the separator is particularly required to have a low electrical resistance (electrical conductivity) in addition to such properties as gas impermeability, stability for warm (hot) water, sulfuric acid resistance and a high mechanical strength. Traditionally, there has been studied a method for shaping a plate material made of titanium or graphite by a mechanical processing such as a machining processing. However, this process lacks mass-productivity and it is difficult to carry out the process on an industrial scale.

Japanese Patent Application Laid-Open No. 334927/1998 (JP-10-334927A) discloses a separator for a polymer electrolyte fuel cell, which is obtained by molding a resin composition comprising a carbon powder and a thermosetting resin (e.g., a phenolic resin, a polyimide resin, an epoxy resin, and a furan resin) by means of a resin molding method (or process). However, the phenolic resin used as the thermosetting resin is slow in hardening, and low in productivity. For example, in Examples of the document, it takes not shorter than ten hours to harden the resin. Moreover, since a gas such as water vapor is generated as accompanied with hardening the phenolic resin, the hardened product has warp and is deteriorated in gas impermeability.

Japanese Patent Application Laid-Open No. 267062/1992 (JP-4-267062A) discloses a gas separator for a fuel cell, which is made of stainless steel or copper. However, although a high industrial productivity is achieved by making the separator with the above metal, the deterioration of the material is caused by contacting the separator with fuel hydrogen gas for a long period of time. Accordingly, the separator rapidly deteriorates cell characteristics.

Further, Japanese Patent Application Laid-Open No. 151833/2001 (JP-2001-151833A) discloses a hardening resin composition consisting of (A) a vinyl ester resin, (B) a monomer selected from the group consisting of an allyl ester monomer, an acrylic ester monomer and a methacrylic ester monomer, (C) a radical polymerization initiator and (D) a carbon-series filler. This document describes that the resin composition has a conducting property and a low electric resistance, and is particularly useful as a separator for a fuel cell. Japanese Patent Application Laid-Open No. 164063/2002 (JP-2002-164063A) discloses a resin composition for a fuel cell, which comprises an electroconductive agent, a radical-polymerizable resin (e.g., a vinyl ester-series resin), and a radical-polymerizable diluent. This document mentions that the acid value of the radical-polymerizable resin is 0.1 to 5 mgKOH/g. However, this resin composition is apt to deteriorate in electroconductivity, and it is difficult to impart a high electroconductivity to the resin composition while maintaining sufficient mechanical strength.

Further, U.S. Pat. No. 6,251,308 specification discloses a molding composition comprising a radical-polymerizable resin such as an unsaturated polyester resin or a vinyl ester resin, a polymerizable unsaturated monomer having an end ethylene group, an electroconductive filler, a polymerization initiator, and a rheological agent. However, since the rheological agent [or a rheological modifier, so-called a thickening agent] is essential for the molding composition, it is difficult to obtain a molded article (e.g., a plate for a fuel cell) having enough long-term reliability [for example, stability for hot water (e.g., a retention of mechanical property or a retention rate of weight) after treating the molded article in 90° C. hot water for 2000 hours, and chemical resistance (such as acid resistance)]. Moreover, in a kneading method involving heat generation (e.g., a kneading method using a pressure kneader), the composition containing the rheological agent rapidly increases in viscosity during kneading in many cases. As a result, it is difficult to obtain, from the composition, an improved compounded matter (or an improved compound) excellent in moldability.

It is therefore an object of the present invention to provide an electroconductive resin composition suitable for an electroconductive plate [for example, a separator for a fuel cell (in particular, a polymer electrolyte fuel cell)], an electroconductive plate (e.g., the above-mentioned separator) formed from the resin composition, and a process for producing the electroconductive plate (e.g., the above-mentioned separator) advantageously on an industrial scale.

It is another object of the present invention to provide an electroconductive resin composition having a low electric resistance and showing an improved gas impermeability, stability for warm (hot) water, durability (in particular, acid resistance such as sulfuric acid resistance) and a high mechanical strength, an electroconductive plate (e.g., the above-mentioned separator) formed from the resin composition, and a process for producing the electroconductive plate (e.g., the above-mentioned separator) conveniently and efficiently.

It is still another object of the present invention to provide an electroconductive resin composition with high dimensional accuracy, and a process for producing an electroconductive plate (in particular, a separator for a fuel cell) from the resin composition with high molding accuracy.

DISCLOSURE OF THE INVENTION

The inventors of the present invention made intensive studies to achieve the above objects and finally found that the combination of an electroconductive agent and a radical-polymerizable thermosetting resin system having a specific acid value, practically a specific formulation ensures an electroconductive resin composition which possesses both material properties required for a separator for a fuel cell and industrial productivity. The present invention was accomplished based on the above findings.

That is, the electroconductive resin composition of the present invention comprises an electroconductive agent and a radical-polymerizable thermosetting resin system. The radical-polymerizable thermosetting resin system has an acid value of 15 to 95 mgKOH/g. The radical-polymerizable thermosetting resin system may comprise at least a radical-polymerizable resin (in particular, a radical-polymerizable resin and a radical-polymerizable diluent). In the resin composition, at least one member selected from the group consisting of the radical-polymerizable resin and the radical-polymerizable diluent may have a carboxyl group, and the acid value of the radical-polymerizable thermosetting resin system may be about 20 to 80 mgKOH/g. For example, the radical-polymerizable thermosetting resin system may contain a polymerizable unsaturated carboxylic acid. From the viewpoint of mechanical properties and moldability (or formability), the radical-polymerizable resin is preferably a vinyl ester resin or an unsaturated polyester-series resin.

The vinyl ester resin may include, for example, a vinyl ester resin represented by the following formula (a):

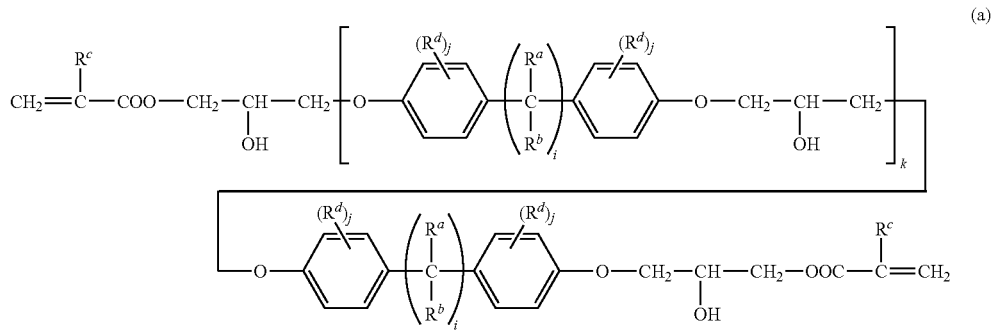

wherein $R^a$ and $R^b$ are the same or different and each represents a hydrogen atom or an alkyl group, $R^c$ represents a hydrogen atom or methyl group, $R^d$ represents a $C_{1-3}$alkyl group, "i" denotes 0 or 1, "j" denotes an integer of 0 to 4, and "k" denotes 0 or an integer of not less than 1.

The vinyl ester resin may be a biphenyl-based vinyl ester resin (a compound in which "i" is 0 in the formula (a)). Hereinafter the vinyl ester resin as well as the biphenyl-based vinyl ester resin is sometimes referred to as a bisphenol-based vinyl ester resin. Such a bisphenol-based vinyl ester resin (for example, a bisphenol A-based vinyl ester resin) may be a mixture of resin components, and these resin components may have the same or different repeating number "k". For example, the bisphenol-based vinyl ester resin may comprise a plurality of resin components different in the number of "k" in the formula (a), and the proportion (weight ratio) of the resin component in which "k" is 0 or 1 (in particular, "k" is 0) relative to the resin component in which "k" is not less than 4 (e.g., "k" is about 4 to 8) [the former resin/the latter resin] may be about 95/5 to 5/95.

In view of crosslinking property, the double bond equivalent of the radical-polymerizable resin is preferably about 200 to 1000. Moreover, considering from a working temperature of a separator, the hardened product of the radical-polymerizable thermosetting resin system preferably has a glass transition temperature of not lower than 120° C. The radical-polymerizable diluent may contain an aromatic vinyl compound. The proportion of the aromatic vinyl compound may be, for example, about 5 to 60% by weight (e.g., about 5 to 40% by weight) in the radical-polymerizable thermosetting resin system. The radical-polymerizable diluent may further contain a compound represented by the formula (1):

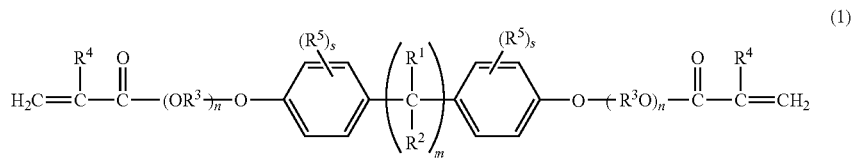

wherein $R^1$ and $R^2$ represents a hydrogen atom or a $C_{1-3}$alkyl group, $R^3$ represents a $C_{2-4}$alkylene group, $R^4$ represents a hydrogen atom or methyl group, $R^5$ represents a $C_{1-3}$alkyl group, "n" denotes an integer of 0 to 5, "m" denotes 0 or 1, and "s" denotes an integer of 0 to 4.

The resin composition may further comprise a low profile additive (or low profile agent). The low profile additive may be a non-polymerizable resin (e.g., a saturated polyester-series resin, or an acrylic resin), a resin particle (e.g., a multilayer resin particle), and others. In particular, the low profile additive may be a resin particle. The proportion (weight ratio) of the electroconductive agent relative to the radical-polymerizable thermosetting resin system [the electroconductive agent/the radical-polymerizable thermosetting resin system] is about 55/45 to 95/5. The electroconductive agent preferably includes a carbon powder.

Concrete examples of the resin composition (e.g., a resin composition for a fuel cell separator) may include a resin composition which comprises a radical-polymerizable thermosetting resin system comprising an vinyl ester resin or an unsaturated polyester-series resin each having a plurality of α,β-ethylenically unsaturated bonds, an aromatic vinyl compound and (meth)acrylic acid, and a carbon powder, wherein the proportion (weight ratio) of the carbon powder relative to the radical-polymerizable thermosetting resin system [the former/the latter] is about 65/35 to 95/5, and the radical-polymerizable thermosetting resin system has an acid value of about 15 to 95 mgKOH/g (e.g., about 15 to 70 mgKOH/g).

The resin composition may further comprise a low profile additive (e.g., a saturated polyester-series resin, an acrylic resin, and a multilayer resin particle).

The present invention also includes an electroconductive plate (e.g., a separator for a fuel cell) formed from the resin composition (more specifically, an electroconductive plate comprising a hardened product of the resin composition). The plate has a low electric resistance, and is excellent in stability for warm (hot) water and gas impermeability. For example, regarding the stability for warm (hot) water of the plate, the retention rate of weight and that of flexural strength after immersion in 90° C. hot water for 2000 hours are not less than 98% and not less than 95% relative to those before immersion, respectively. Moreover, the resin composition is also excellent in moldability (or formability). Accordingly, the present invention also includes a process for producing the plate, which comprises forming the resin composition by a resin molding method. Further, in the production of the resin composition, since the present invention is also applicable to an exothermic kneading method, for example, the plate may be produce by kneading the electroconductive agent and the radical-polymerizable thermosetting resin system (e.g., a resin composition at least comprising the radical-polymerizable resin and the radical-polymerizable diluent) by means of a pressure kneader to prepare a compounded matter (or a compound), and molding the compounded matter by the resin molding method.

Incidentally, throughout this specification, the phrase "a radical-polymerizable thermosetting resin system" means a resin composition comprising at least a radical-polymerizable resin. In the case of using a radical-polymerizable diluent and/or a low profile additive with the resin, the system means a composition containing these components. Moreover, the phrase "a radical-polymerizable resin" means a polymer (or a macromolecule) or oligomer compound having a radical-polymerizable unsaturated bond. The phrase "a radical-polymerizable diluent" means a monomer having a radical-polymerizable unsaturated bond.

DETAILED DESCRIPTION OF THE INVENTION

Electroconductive Agent

As the electroconductive agent (or electrically conductive agent), a variety of components may be employed as far as the electroconductive agent contributes to decline electric resistance. Examples of such a component may include a carbon powder (e.g., a conventional artificial or synthetic graphite powder, an expanded graphite powder, a natural graphite powder, a coke powder, and an electroconductive carbon black), a carbon fiber and a metal powder. These electroconductive agents may be used singly or in combination. As the electroconductive agent, a powdery electroconductive agent such as a carbon powder is usually employed. In order to fill these electroconductive agents with high density, these agents may be a size-controlled powder or a surface-pretreated powder.

The average particle size of the electroconductive agent (in particular, the carbon powder) cannot specify categorically because of having a close relevancy to the proportion of each component in the radical-polymerizable thermosetting resin system, and is usually about 10 nm to 450 μm, preferably about 1 to 400 μm and more preferably about 5 to 350 μm.

In particular, the proportion of the electroconductive agent (a coarse particle) having a particle size of about 30 to 450 μm (e.g., about 50 to 400 μm) may be not less than 30% by weight (e.g., about 30 to 99% by weight), preferably not less than 40% by weight (e.g., about 40 to 98% by weight), and more preferably not less than 50% by weight (e.g., about 50 to 95% by weight), relative to the whole electroconductive agent. Further, the proportion of the electroconductive agent having a relatively large particle size (about 100 to 350 μm) may be not less than 5% by weight (e.g., about 5 to 95% by weight), preferably not less than 10% by weight (e.g., about 10 to 95% by weight), and more preferably not less than 30% by weight (e.g., about 30 to 95% by weight), relative to the whole electroconductive agent. The electroconductive composition comprising the electroconductive agent having such a specific range of the particle size in the above proportion can efficiently reduce electric conductivity.

Moreover, the electroconductive agent having a relatively small particle size has an increased surface area compared with that of the resin component, and insufficiently adheres (or contacts) to the resin in the interface between the agent and the resin. There is therefore a possibility of lowering mechanical properties (e.g., brittleness (or fragile)) of a shaped article (for example, an electroconductive plate). Accordingly, the proportion of the electroconductive agent (a fine particle) having a relatively small particle size [smaller than 30 μm, e.g., about 10 nm to smaller than 30 μm (e.g., about 15 nm to 25 μm), and preferably about 1 to 10 μm] is not more than 50% by weight (e.g., about 0 to 50% by weight), preferably not more than 30% by weight (e.g., about 1 to 30% by weight), and more preferably not more than 15% by weight (e.g., about 1 to 10% by weight), relative to the whole electroconductive agent. Further, the proportion (molar ratio) of the coarse particle (the electroconductive agent having a particle size of 30 to 450 μm) relative to the fine particle (the electroconductive agent having a particle size of smaller 30 μm) [the former/the latter] may be about 100/0 to 50/50, preferably about 100/0 to 70/30 (e.g., about 99/1 to 80/20), and more preferably about 100/0 to 90/10 (e.g., about 99/1 to 95/5).

[Radical-Polymerizable Thermosetting Resin System]

(Radical-Polymerizable Resin)

The radical-polymerizable thermosetting resin system comprises at least a radical-polymerizable resin. The resin system may comprise the radical-polymerizable resin alone. As the radical-polymerizable resin, there may be used a resin or oligomer having an α,β-ethylenically unsaturated bond (a polymerizable unsaturated bond), for example, a vinyl ester resin, an unsaturated polyester-series resin, a urethane (meth)acrylate, and a polyester (meth)acrylate. These radical-polymerizable resins may be used singly or in combination. The radical-polymerizable resin usually has a plurality of α,β-ethylenically unsaturated bonds.

(1) Vinyl Ester Resin

The vinyl ester resin (e.g., an epoxy (meth)acrylate) is a reaction product obtainable from a ring-opening addition reaction between an epoxy group and a carboxyl group of an α,β-ethylenically unsaturated compound, and is an oligomer having an α,β-ethylenically unsaturated bond (such as (meth)acryloyl group) in the end of a molecule thereof. The vinyl ester resin may include, for example, a reaction product between a mono- or more functional compound having an epoxy group in a molecule thereof and a carboxyl group-containing ethylenically unsaturated compound (e.g., an unsaturated monobasic acid).

The mono- or more functional compound having an epoxy group in a molecule thereof may include an epoxy resin, and a compound having an epoxy group and a (meth)acryloyl group in a molecule thereof.

Examples of the epoxy resin may include a glycidyl ether-series epoxy resin, a glycidyl ester-series epoxy resin, an alicyclic epoxy resin having an epoxidized double bond in a cycloalkene ring (such as a cyclohexene ring) thereof, a glycidylamine-series epoxy resin, and a copolymer epoxy resin.

The glycidyl ether-series epoxy resin may include a bisphenol-based epoxy resin [for example, an epoxy resin having a bis(hydroxyphenyl)$C_{1-10}$alkane skeleton, such as a bisphenol A-based, a bisphenol F-based, or a bisphenol AD-based epoxy resin, and a bisphenol S-based epoxy resin], a novolak epoxy resin (e.g., a phenol-novolak epoxy resin, and a cresol novolak epoxy resin), an aliphatic epoxy resin (e.g., a hydrogenated bisphenol A-based epoxy resin, a propylene glycol mono- or diglycidyl ether, and a pentaerythritol mono- to tetraglycidyl ether), a monocyclic epoxy resin (e.g., resorcin glycidyl ether), a heterocyclic epoxy resin (e.g., triglycidyl isocyanurate having a triazine ring, and a hydantoin-based epoxy resin having a hydantoin ring), and tetrakis (glycidyloxyphenyl)ethane.

Examples of the glycidyl ester-based epoxy resin may include a glycidyl ester of a carboxylic acid (particularly a polycarboxylic acid), for example, diglycidyl phthalate, diglycidyl terephthalate, dimethylglycidyl phthalate, diglycidyl tetrahydrophthalate, and diglycidyl hexahydrophthalate.

As the alicyclic epoxy resin, there may be mentioned, for example, an alicyclic diepoxy acetal, an alicyclic diepoxy adipate, an alicyclic diepoxy carboxylate, a vinylcyclopentadiene dioxide, and a vinylcyclohexene mono- or dioxide.

Examples of the glycidylamine-based epoxy resin may include a reaction product between an amine (in particular, a polyamine) and epichlorohydrin, for example, tetraglycidyl-diaminodiphenylmethane, triglycidylaminophenol, diglycidylaniline, and diglycidyltoluidine.

The copolymer epoxy resin may include, for example, a copolymer having both a bisphenol A skeleton and a bisphenol F skeleton.

These epoxy resins may be, if necessary, a halogenated epoxy resin having a halogen atom (e.g., bromine, and chlorine). Incidentally, commercial items of the epoxy resin may be referred to, for example, Japanese Patent Application Laid-Open No. 110948/1997 (JP-9-110948A).

The epoxy equivalent of the epoxy resin is not particularly limited to a specific one because the preferred range of the epoxy equivalent varies depending on the particle size of the electroconductive agent (e.g., the carbon powder). The epoxy equivalent of the epoxy resin is about 50 to 5000 g/eq, preferably about 100 to 1000 g/eq, and more preferably 150 to 500 g/eq (in particularly, about 170 to 250 g/eq). In particular, the epoxy equivalent of the bisphenol-based epoxy resin (e.g., a bisphenol A-based epoxy resin) may be about 50 to 2000 g/eq, preferably about 100 to 1500 g/eq, and more preferably about 120 to 1000 g/eq (e.g., about 150 to 800 g/eq).

Examples of the compound having both an epoxy group and a (meth)acryloyl group in a molecule thereof may include glycidyl (meth)acrylate, a $C_{1-4}$alkylglycidyl (meth)acrylate such as methylglycidyl (meth)acrylate, and a (meth)acryloyloxyalkyl$C_{4-6}$cycloalkene oxide such as 4-(meth)acryloyloxymethylcyclohexene oxide.

Among these epoxy group-containing compounds, the glycidyl ether-based epoxy resin, and the epoxy resin having a saturated or unsaturated hydrocarbon ring or a heterocycle, in particular the bisphenol-based epoxy resin, are preferred. The bisphenol-based epoxy resin (e.g., the bisphenol A-based epoxy resin) has a low viscosity, and can increase the percentage of the electroconductive agent. Therefore, the bisphenol-based epoxy resin is also preferred from the viewpoint of acid resistance (sulfuric acid resistance). Moreover, the bisphenol-based epoxy resin can enhance moldability of the resin composition, and improve mechanical strength of a shaped article formed from such a composition in the light of the above-mentioned properties.

The carboxyl group-containing ethylenically unsaturated compound (e.g., an unsaturated monobasic acid) may include, for example, an unsaturated monocarboxylic acid such as (meth)acrylic acid, crotonic acid or cinnamic acid, and a reaction product between a polybasic acid anhydride and a compound having both a (meth)acryloyl group and an active hydrogen atom (e.g., hydrogen atom of hydroxyl group) in a molecule thereof (for example, a hydroxyalkyl (meth)acrylate such as 2-hydroxyethyl(meth)acrylate or hydroxypropyl(meth)acrylate).

Examples of the polybasic acid anhydride may include an aliphatic dicarboxylic acid anhydride such as maleic anhydride or succinic anhydride, an aromatic dicarboxylic acid anhydride such as phthalic anhydride, and an alicyclic dicarboxylic acid anhydride such as tetrahydrophthalic anhydride or hexahydrophthalic anhydride. The compound having both a (meth)acryloyl group and an active hydrogen atom may include a monohydroxy compound [for example, a hydroxy$C_{2-6}$alkyl (meth)acrylate such as hydroxyethyl (meth)acrylate, hydroxypropyl (meth)acrylate or hydroxybutyl (meth)acrylate], and a reaction product between (meth) acrylic acid and a polyhydric alcohol [e.g., trimethylolpropane di(meth)acrylate, pentaerythritol tri(meth)acrylate, and glycerin di(meth)acrylate].

Among these carboxyl group-containing ethylenically unsaturated compounds, the unsaturated monocarboxylic acid, particularly (meth)acrylic acid, is preferred.

The proportion (molar ratio) of the carboxyl group-containing ethylenically unsaturated compound relative to the epoxy compound [the carboxyl group/the epoxy group] is about 0.8/1 to 1.2/1, and preferably about 0.9/1 to 1.1/1.

The ring-opening addition reaction between the epoxy group and the carboxyl group may be carried out under conventional conditions. For example, the reaction may be conducted using a tertiary amine (such as a trialkylamine or dimethylbenzylamine) or a phosphine (such as triphenylphosphine) as a catalyst at a reaction temperature of about 80 to 150° C. for about 1 to 10 hours.

Moreover, in the case where thickening the resin is required in the molding process, as the resin may be used a vinyl ester resin capable of being viscous by an alkali, where the vinyl ester resin has a carboxyl group given by adding a polycarboxylic acid anhydride to a hydroxyl group generated from the reaction between the epoxy group and the carboxyl group.

The preferred vinyl ester resin may include the bisphenol-based vinyl ester resin (or the biphenyl-based vinyl ester resin) obtainable from the reaction between the bisphenol-based epoxy resin (or the biphenyl-based epoxy resin) and the carboxyl group-containing ethylenically unsaturated compound [e.g., an unsaturated monocarboxylic acid such as (meth)acrylic acid], in particular the bisphenol-based vinyl ester resin represented by the above-mentioned formula (a).

In the formula (a), examples of the alkyl group represented by the groups $R^a$ and $R^b$ may include a $C_{1-20}$alkyl group such as methyl group, ethyl group, propyl group, butyl group, hexyl group or lauryl group, preferably a $C_{1-10}$alkyl group, more preferably a $C_{1-5}$alkyl group, and particularly a $C_{1-3}$alkyl group. The number "i" is 0 or 1, and usually 1.

The group $R^c$ is a hydrogen atom or methyl group. Each of the group $R^c$ may be the same or different.

The group $R^d$ is a $C_{1-3}$alkyl group, preferably a $C_{1-2}$alkyl group (methyl or ethyl group). The number "j" of the $C_{1-3}$alkyl group is 0 to 4, preferably about 0 to 2, and usually 0.

The repeating number "k" of the bisphenol or biphenyl (e.g., bisphenol A) skeleton may be about 0 to 50, preferably about 0 to 30, and more preferably about 0 to 20 (e.g., about 0 to 15).

The preferred bisphenol-based vinyl ester resin is a resin represented by the formula (a), in which $R^a$ and $R^b$ are a hydrogen atom or methyl group (particularly both $R^a$ and $R^b$ are methyl group), "i" is 1, $R^c$ is a hydrogen atom or methyl group, $R^d$ is a $C_{1-2}$alkyl group, "j" is 0 to 2 (particularly 0) and "k" is 0 to 30 (e.g., 0 to 20).

The representative bisphenol-based vinyl ester resin represented by the formula (a) includes a bisphenol A-based vinyl ester resin represented by the following formula (a1):

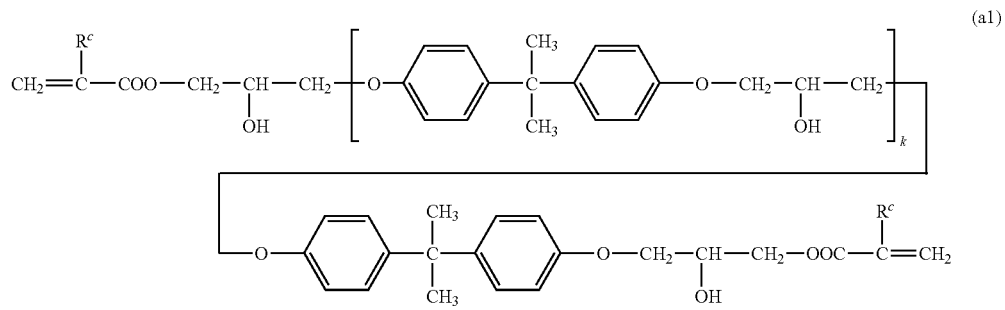

(a1)

wherein $R^c$ and "k" have the same meanings as defined above.

The molecular weight (or the average molecular weight) of the bisphenol-based vinyl ester resin (e.g., the bisphenol A-based vinyl ester resin) is determined depending on the repeating number "k" of the bisphenol skeleton in the formula (a) or (a1). The bisphenol-based vinyl ester resin may be composed of monodispersive resins each having the same repeating number "k", and usually may be a mixture containing vinyl ester resins which are different in the repeating numbers "k" from one another.

Incidentally, there are some cases where the repeating number "k" has some effects on moldability or properties of the shaped article. For example, a vinyl ester resin having a small repeating number "k" (e.g., k=0 or 1, in particular k=0) is highly reactive, and can impart an excellent mechanical strength to the shaped article at a low viscosity. In addition, such a resin has an improved dispersibility of the electroconductive agent. However, in the case where a composition is substantially formed (or molded) without increasing the viscosity of the resin by the thickening agent, the resin is easy to separate from the electroconductive agent in the process of the forming (or molding) step, resulting in generation of weld flash. High content of the electroconductive agent in the composition has a possibility to make a hardened product fragile.

Therefore, the proportion of the bisphenol-based vinyl ester resin having the repeating number "k" of 0 (in particular, the bisphenol A-based vinyl ester resin) (hereinafter, sometimes referred to as a low molecular weight resin component $B_0$) may be not more than 90% by weight (e.g., 0 to 90% by weight), preferably not more than 70% by weight (e.g., 5 to 70% by weight), and more preferably not more than 50% by weight (e.g., 10 to 50% by weight), relative to the whole radical-polymerizable resin (in particular, the bisphenol A-based vinyl ester resin).

Moreover, a vinyl ester resin having a relatively large number "k" [for example, not less than 4 (e.g., about 4 to 8, preferably about 4 to 6, and in particular about 4 to 5)] can maintain a good compound state of the electroconductive agent and the radical-polymerizable resin without addition of the thickening agent, and can impart satisfactory toughness to the hardened product. The proportion of the bisphenol-based vinyl ester resin having the repeating number "k" of not less than 4 (in particular, the bisphenol A-based vinyl ester resin) (hereinafter sometimes referred to as a high molecular weight resin component $B_1$) may be therefore not less than 5% by weight (e.g., about 5 to 100% by weight), preferably not less than 10% by weight (e.g., about 10 to 99% by weight), and more preferably not less than 20% by weight (e.g., about 20 to 95% by weight), relative to the whole radical-polymerizable resin (in particular, the bisphenol A-based vinyl ester resin).

The proportion (molar ratio) of the low molecular weight resin component $B_0$ relative to the high molecular weight resin component $B_1$ [the former/the latter] may be, for example, about 95/5 to 0/100 (e.g., about 95/5 to 5/95), preferably about 80/20 to 0/100, and more preferably about 70/30 to 0/100 (e.g., about 60/40 to 5/95). Incidentally, the proportion of the low molecular weight resin component $B_0$ relative to the high molecular weight resin component $B_1$ may be, for example, determined through the use of fractionation or area ratio by gel-permeation chromatography.

(2) Unsaturated Polyester-Series Resin

As the unsaturated polyester-series resin, there may be used a reaction product from a reaction of an unsaturated polybasic acid and a polyol, and if necessary a saturated polybasic acid.

As the polybasic acid, a dicarboxylic acid or a reactive derivative thereof is usually employed.

Examples of the unsaturated polybasic acid may include a $C_{4-6}$aliphatic unsaturated polybasic acid or an anhydride thereof, such as maleic anhydride, maleic acid, fumaric acid or itaconic acid.

The saturated polybasic acid may include a $C_{2-10}$aliphatic saturated polybasic acid such as oxalic acid, malonic acid, succinic acid, glutaric acid, adipic acid, suberic acid or sebacic acid; a $C_{8-12}$ aromatic polybasic acid or an anhydride thereof, such as isophthalic acid, terephthalic acid, phthalic acid, phthalic anhydride, tetrachlorophthalic anhydride, trimellitic acid or pyromellitic acid; and a $C_{8-10}$ alicyclic polybasic acid or an anhydride thereof, such as 1,4-cyclohexanedicarboxylic acid, tetrahydrophthalic acid, HET acid (1,4,5,6,7,7-hexachlorobicyclo[2.2.1]hepta-5-ene-2,3-dicarboxylic acid), HET anhydride, or nadic anhydride.

The proportion of the unsaturated polybasic acid in the polybasic acid is, for example, about 25 to 100 mol %, preferably about 30 to 100 mol %, and more preferably about 50 to 100 mol %.

Examples of the polyol may include a $C_{2-12}$ alkylene glycol (e.g., ethylene glycol, propylene glycol, butanediol, 1,5-pentanediol, 3-methyl-1,5-pentanediol, 1,6-hexanediol, and neopentyl glycol), a polyoxy$C_{2-4}$alkylene glycol (e.g., diethylene glycol, triethylene glycol, dipropylene glycol, and tripropylene glycol), and an aromatic diol (e.g., bisphenol A, and a bisphenol A-$C_{2-4}$alkyleneoxide adduct).

The esterification reaction may be carried out by a conventional method, for example, may be carried out, with removal of generated water from the reaction system, at a temperature of about 70 to 120° C. under an atmospheric pressure or a reduced pressure in the presence of an esterification catalyst under an inactive gas atmosphere.

In the polybasic acid and the polyol, the proportion (molar ratio) of the carboxyl group in the polybasic acid relative to the hydroxyl group in the polyol is usually about 0.7/1 to 1.3/1, and preferably about 0.8/1 to 1.2/1.

(3) Urethane (meth)acrylate

As the urethane (meth)acrylate, there may be used a reaction product between a polyurethane oligomer having an isocyanate group at a terminal thereof and the above-mentioned hydroxy$C_{2-6}$alkyl(meth)acrylate.

As the polyurethane oligomer, a conventional polyurethane oligomer obtained from a diol component and an excess amount of a diisocyanate component relative to the diol component may be used. For example, such a polyurethane oligomer may include a reaction product between a diisocyanate component (e.g., an aromatic diisocyanate such as tolylene diisocyanate or diphenylmethane diisocyanate, an araliphatic diisocyanate such as xylylene diisocyanate or tetramethylxylylene diisocyanate, an alicyclic diisocyanate such as isophorone diisocyanate, and an aliphatic diisocyanate such as hexamethylene diisocyanate) and a diol component (e.g., a polyetherdiol such as a $C_{2-12}$alkylene glycol or a polyoxy$C_{2-4}$ alkylene glycol, a polyesterdiol, and a polycarbonatediol).

The proportion (molar ratio) of the hydroxyl group relative to the isocyanate group in the urethane oligomer [the hydroxyl group/the isocyanate group] is about 0.7/1 to 1.2/1, preferably about 0.8/1 to 1.1/1, and more preferably about 0.9/1 to 1/1.

The urethanation reaction is carried out by a conventional method, for example, in the presence of a catalyst at a temperature of about 50 to 100° C. under an inactive gas atmosphere.

(4) Polyester (meth)acrylate

Examples of the polyester (meth)acrylate to be used may include a reaction product between a polyester oligomer having a hydroxyl group or a carboxyl group in a terminal thereof and the above-mentioned (meth)acrylic acid or hydroxy$C_{2-6}$ alkyl(meth)acrylate or glycidyl (meth)acrylate.

The polyester oligomer may be linear, or have a branched structure due to use of a polyhydric alcohol (e.g., glycerin) as well as a monomer constituting the unsaturated polyester. The polyester oligomer may be obtained by adjusting proportions of a polybasic acid (in particular a saturated polybasic acid) and a polyol, and subjecting these components to an esterification reaction similar to the above-mentioned esterification.

The amount of the above (meth)acrylic acid, hydroxy$C_{2-6}$ alkyl(meth)acrylate or glycidyl(meth)acrylate is about 0.8 to 1.2 mol and preferably about 0.9 to 1.2 mol relative to 1 mol of the hydroxyl group or the carboxyl group in the polyester oligomer.

Among these radical-polymerizable resins, from the viewpoint of a high acid resistance (e.g., sulfuric acid resistance), mechanical properties and mold-flowability, it is preferred to use the vinyl ester resin (particularly the vinyl ester resin having a bisphenol skeleton) such as a bisphenol A-based vinyl ester resin, the unsaturated polyester-series resin [particularly, the unsaturated polyester-series resin having a halogen atom (e.g., an unsaturated polyester-series resin where the polycondensation component is a chlorine atom-containing dicarboxylic acid or an anhydride thereof such as a chlorine atom-containing $C_{8-12}$aromatic polybasic acid or an anhydride thereof (e.g., tetrachlorophthalic anhydride) and a chlorine atom-containing aromatic $C_{8-10}$alicyclic polybasic acid or an anhydride thereof (such as HET acid or HET anhydride)).

The double bond equivalent in the radical-polymerizable resin is about 200 to 1000, preferably about 200 to 800, and more preferably about 200 to 650. Too small double bond equivalent brings about a hardened product having an extremely high crosslinking density. Such a hardened product is fragile to use industrially. On the contrary, too large double bond equivalent makes crosslinking in an obtained hardened product insufficient, and it becomes difficult to impart enough heat resistance, mechanical properties and others to the hardened product.

The acid value of the radical-polymerizable resin is about 0 to 90 mgKOH/g, preferably about 0 to 50 mgKOH/g, and more preferably about 0 to 30 mgKOH/g (e.g., about 0 to 20 mgKOH/g).

(Radical-Polymerizable Diluent)

For less viscosity or adjustment of the crosslinking density, the radical-polymerizable resin is preferably diluted with a reactive diluent (a radical-polymerizable diluent) having at least one double bond (especially an $\alpha,\beta$-ethylenically unsaturated bond) in a molecule thereof. The diluent may be used singly or in combination.

Examples of the radical-polymerizable diluent may include an unsaturated carboxylic acid such as (meth)acrylic acid, crotonic acid or cinnamic acid; a $C_{1-12}$alkyl ester of an unsaturated carboxylic acid, such as methyl (meth)acrylate, ethyl(meth)acrylate, propyl (meth)acrylate, butyl(meth)acrylate, 2-ethylhexyl (meth)acrylate, isononyl(meth)acrylate or dodecyl (meth)acrylate; a $C_{5-10}$cycloalkyl(meth)acrylate such as cyclohexyl(meth)acrylate; an ester of an unsaturated carboxylic acid having an aromatic ring, such as benzyl (meth)acrylate or phenoxyethyl(meth)acrylate; a glycidyl ester of an unsaturated carboxylic acid, such as glycidyl (meth)acrylate; a hydroxy$C_{2-8}$alkyl ester of an unsaturated carboxylic acid, such as 2-hydroxyethyl(meth)acrylate; a nitrogen-containing monomer such as (meth)acrylamide, (meth)acrylonitrile or vinyl pyrrolidone; an aromatic vinyl compound such as styrene, vinyltoluene, divinylbenzene or p-t-butylstyrene; an aromatic vinylidene; an unsaturated dicarboxylic acid such as maleic acid, fumaric acid, citraconic acid or itaconic acid; an ester of a $C_{2-8}$alkylene glycol and an unsaturated carboxylic acid, such as ethylene glycol di(meth)acrylate, 1,4-butandiol di(meth)acrylate, 1,6-hexanediol di(meth)acrylate, neopentyl glycol di(meth)acrylate, butylene glycol di(meth)acrylate or hexanediol di(meth)acrylate; an ester of a polyoxyalkylene glycol and an unsaturated carboxylic acid, such as diethylene glycol di(meth)acrylate; a polyfunctional (meth)acrylate such as trimethylolpropane di(meth)acrylate, trimethylolpropane tri(meth)acrylate, pentaerythritol tri(meth)acrylate or pentaerythritol tetra(meth) acrylate; and an aromatic divinyl compound such as divinylbenzene.

The radical-polymerizable diluent may contain a compound represented by the above-mentioned formula (1). In the formula (1), $R^1$ and $R^2$ are a hydrogen atom or a $C_{1-3}$alkyl group (e.g., methyl, ethyl, or propyl group), and $R^1$ and $R^2$ may be the same or different from each other. The groups $R^1$ and $R^2$ are preferably a hydrogen atom or methyl group, and usually both $R^1$ and $R^2$ are methyl groups. The compound (1) may have a biphenyl skeleton (i.e., m=0), and usually has a bisphenolalkane skeleton (i.e., m=1).

The group $R^3$ is a $C_{2-4}$alkylene group such as ethylene, propylene, trimethylene, or tetramethylene group. The repeating number "n" of the oxyalkylene group may be selected from the range of about 0 to 5, and is usually about 1 to 5, preferably about 1 to 4 and more preferably about 1 to 3. The species of the alkylene group $R^3$ may vary depending on the repeating number "n". When the number "n" is an integer of not less than 2, the alkylene groups $R^3$ may contain different alkylene groups from one another.

The group $R^5$ is a $C_{1-3}$alkyl group, and preferably a $C_{1-2}$alkyl group (methyl or ethyl group). The number "s" of the alkyl group is about 0 to 4 and preferably about 0 to 2, and usually the number "s" is 0.

In the preferred compound (1), $R^1$ and $R^2$ are a hydrogen atom or methyl group (in particular both $R^1$ and $R^2$ are methyl group), "m" is 1, $R^3$ is a $C_{2-3}$alkylene group (in particular ethylene group), "n" is 0 to 3 (in particular 1 to 3), $R^4$ is a hydrogen atom or methyl group, $R^5$ is a $C_{1-2}$alkyl group, and "s" is 0 to 2 (e.g., 0).

The compound (1) may include, for example, 4,4'-bis[(meth)acryloyloxy]biphenyl, a 4,4'-bis[(meth)acryloyloxy$C_{2-4}$alkoxy]biphenyl such as 4,4'-bis[(2-(meth)acryloyloxy-ethoxy)]biphenyl, bis[4-(2-(meth)acryloyloxyphenyl)methane, a bis(4-(meth)acryloyloxy$C_{2-4}$alkoxyphenyl)$C_{1-4}$alkane such as bis[4-(2-(meth)acryloyloxy-ethoxyphenyl)methane, 1,1-bis[4-(2-(meth)acryloyloxy-ethoxy)phenyl]ethane, 2,2-bis[4-(2-(meth)acryloyloxy-ethoxyphenyl)]propane, 2,2-bis[4-(2-(meth)acryloyloxy-propoxy)phenyl]propane or 1,1-bis[4-(2-(meth)acryloyloxy-ethoxy)phenyl]butane, a bis($C_{1-3}$alkyl-4-(meth)acryloyloxy$C_{2-4}$alkoxyphenyl)$C_{1-4}$alkane such as bis(3-methyl-4-(meth)acryloyloxy-ethoxyphenyl) methane, bis[2-ethyl-4-(2-(meth)acryloyloxy-ethoxy)phenyl]methane, 2,2-bis[3-ethyl-4-(2-(meth)acryloyloxy-ethoxy)phenyl]propane or 2,2-bis[2-ethyl-4-(2-(meth)acryloyloxy-ethoxy)phenyl]propane, a bis(di$C_{1-3}$alkyl-4-(meth)acryloyloxy$C_{2-4}$alkoxyphenyl)$C_{1-4}$alkane such as bis[3,5-dimethyl-4-(2-(meth)acryloyloxy-ethoxy)phenyl] methane or 2,2-bis[3,5-dimethyl-4-(2-(meth)acryloyloxy-ethoxy)phenyl]propane, and a compound corresponding to such a compound where "n" is 2 to 5 in the formula (1).

Among them, generally used one is a bis(4-(meth)acryloxy (poly)$C_{2-3}$alkoxyphenyl)propane such as 2,2-bis{4-[2-(2-(meth)acryloxy-ethoxy)-ethoxy]phenyl}propane (that is, a compound where both $R^1$ and $R^2$ are methyl group, $R^3$ is ethylene group, $R^4$ is a hydrogen atom, "n" is 2, "m" is 1, and "s" is 0 in the formula (1)).

(Acid Value of Resin System)

In the present invention, the acid value of the radical-polymerizable thermosetting resin system is about 15 to 95 mgKOH/g, preferably about 20 to 80 mgKOH/g, more preferably about 20 to 70 mgKOH/g, and usually about 15 to 70 mgKOH/g. Incidentally, it has been understood that the acid value of the radical-polymerizable thermosetting resin system should be as low as possible (e.g., not more than 5 mgKOH/g) in order to enhance warm (hot) water resistance of the resin composition. According to the present invention, however, the acid value of the radical-polymerizable thermosetting resin system to be not lower than 15 mgKOH/g ensures to remarkably improve dispersibility of the electroconductive agent in the resin composition and to reduce electric resistance of the resin composition. In particular, not only dispersibility of the electroconductive agent but also mechanical properties of the resin composition can be also improved by using the radical-polymerizable thermosetting resin system from the specific radical-polymerizable resin and the radical-polymerizable diluent in combination, and controlling the acid value of the radical-polymerizable thermosetting resin system to be not lower than 15 mgKOH/g. In addition, electric resistance can be greatly reduced. Further, the radical-polymerizable thermosetting resin system having an acid value of not higher than 95 mgKOH/g can inhibit deterioration in mechanical properties, stability, heat resistance and others of the resin composition because water absorbing property of the electroconductive agent is extremely low.

The acid value of the radical-polymerizable thermosetting resin system may be adjusted by component (s) constituting the radical-polymerizable thermosetting resin system, for example, the radical-polymerizable resin, the radical-polymerizable diluent, or other additive(s). Although the species of the acid (in particular an organic acid) is not particularly limited to a specific one, the acid having an extremely high water absorbing property (e.g., sulfonic acid, and sulfuric acid) may have an adverse effect on stability of the electroconductive plate (e.g., the separator for a fuel cell). Therefore, an acid having a carboxyl group (an organic carboxylic acid) is preferred.

In the preferred embodiment, at least one member selected from the group consisting of the radical-polymerizable resin and the radical-polymerizable diluent has a carboxyl group. Accordingly, the acid value of the resin system may be adjusted, for example, with the carboxyl group of the radical-polymerizable resin. For introducing a carboxyl group into the radical-polymerizable resin, for example, the amount of a saturated or unsaturated monobasic acid or a saturated or unsaturated polybasic acid may be increased in the monomer constituting the resin. More specifically, the acid value may be controlled, in the vinyl ester resin, by allowing an epoxy resin in an epoxy compound (particularly an epoxy resin having epoxy groups of not less than 2) to react with an excess equivalent amount of carboxyl group in an unsaturated polybasic acid or an acid anhydride thereof in addition to a polymerizable monobasic acid; and, in the unsaturated polyester-series resin, by allowing a hydroxyl group in a polyol (particularly a diol) to react with an excess equivalent amount of carboxyl group in a polybasic acid (e.g., maleic anhydride, and a polybasic acid having a carboxyl group of not less than 3). Furthermore, if necessary, a carboxyl group may be given by using a polyfunctional monomer having hydroxyl groups of not less than 3 as a part of a polyol component to introduce a branched structure, and reacting thus obtained hydroxyl group with a saturated or unsaturated polybasic acid or an acid anhydride thereof. Incidentally, in the case where the acid value is adjusted with the radical-polymerizable resin alone, as the acid value increase, operationality for reaction is sometimes deteriorated or properties of the radical-polymerizable resin cannot be effectively expressed in some cases.

For the adjustment of the acid value, therefore, it is advantageous to use the radical-polymerizable diluent having at least a carboxyl group. The diluent having a carboxyl group may include, for example, an unsaturated monobasic acid [e.g., an unsaturated monocarboxylic acid such as (meth) acrylic acid, crotonic acid or cinnamic acid, and a reaction product between a polybasic acid anhydride and a compound having both an (meth)acryloyl group and an active hydrogen atom (e.g., hydroxyl group) in a molecule thereof (e.g., the above-mentioned hydroxyalkyl (meth)acrylate)], and a polymerizable unsaturated carboxylic acid or an acid anhydride thereof, such as an unsaturated polybasic acid (e.g., a $C_{4-6}$aliphatic unsaturated polybasic acid or an anhydride thereof, such as maleic anhydride, maleic acid, fumaric acid or itaconic acid). These carboxyl group-containing diluents may be used singly or in combination. As the carboxyl group-containing diluent, usually the unsaturated monobasic acid such as (meth)acrylic acid may be employed.

The content of the polymerizable unsaturated carboxylic acid may be selected so that the acid value is adjustable within the above-mentioned range, in association with the radical-polymerizable resin. For example, the content of the polymerizable unsaturated carboxylic acid is about 0.5 to 30% by weight, preferably about 1 to 20% by weight (e.g., about 3 to 20% by weight), more preferably about 2 to 15% by weight, and usually about 3 to 18% by weight in the radical-polymerizable thermosetting resin system. The polymerizable unsaturated carboxylic acid is used in combination with other radical-polymerizable diluent in many cases. In the case of using an aromatic vinyl compound as other radical-polymerizable diluent, the proportion (molar ratio) of the aromatic vinyl compound relative to the polymerizable unsaturated carboxylic acid is about 99.5/0.5 to 30/70, preferably about 99/1 to 50/50, and more preferably about 97/3 to 70/30.

The proportion (molar ratio) of the radical-polymerizable resin relative to the radical-polymerizable diluent [the former/the latter] may be usually selected from the range of about 100/0 to 20/80, and is about 95/5 to 20/80, preferably about 90/10 to 40/60 and more preferably about 90/10 to 50/50 (e.g., about 90/10 to 55/45).

Incidentally, the species of the radical-polymerizable diluent may be suitably selected depending on properties and others of the resin composition. Among the diluents, for example, the aromatic vinyl compound (in particular styrene) has a high copolymerizability with the radical-polymerizable resin (e.g., the vinyl ester resin) compared with a (meth) acrylic monomer (diluent), and can improve physical properties of an obtained shaped article (e.g., mechanical strength). In addition, the aromatic vinyl compound can improve moldability even at a small amount due to its high dilution efficiency (or lowering viscosity). Moreover, the aromatic vinyl compound is also high in chemical resistance and water resistance compared with other diluent (e.g., an acrylic diluent). Therefore, the radical-polymerizable diluent preferably contains at least the aromatic vinyl compound (in particular styrene).

The amount of the aromatic vinyl compound may be selected from the range as far as the properties of the electroconductive plate (e.g., the separator for a fuel cell) are not deteriorated, and the amount is about 1 to 60% by weight (e.g., about 1 to 50% by weight, particularly about 1 to 40% by weight), preferably about 3 to 50% by weight (e.g., about 3 to 40% by weight), more preferably about 5 to 45% by weight (e.g., about 5 to 40% by weight) and usually about 5 to 60% by weight (e.g., about 20 to 45% by weight) in the radical-polymerizable thermosetting resin system.

Moreover, the use of the compound (1) ensures to decrease electric resistance of the electroconductive plate (e.g., the separator for a fuel cell) while enhancing the mechanical properties. The amount of the compound (1) in the radical-polymerizable thermosetting resin system may be, for example, selected from the range of about 0.1 to 45% by weight, and is usually about 0.1 to 40% by weight (e.g., about 1 to 40% by weight), preferably about 0.1 to 35% by weight (e.g., about 5 to 35% by weight), and more preferably about 5 to 20% by weight. In the case of using aromatic vinyl compound in combination, the proportion (molar ratio) of the both [the aromatic vinyl compound/the compound (1)] is about 99/1 to 10/90, preferably about 95/5 to 30/70, and more preferably about 90/10 to 50/50 (in particular about 85/15 to 70/30).

The proportion (molar ratio) of the electroconductive agent relative to the radical-polymerizable thermosetting resin system [the former/the latter] is about 55/45 to 95/5, preferably about 65/35 to 95/5, and more preferably about 65/35 to 92/8. In the case where the ratio of the electroconductive agent is too small, electroconductivity (conductivity) cannot be improved. Too large ratio of the electroconductive agent makes mold-flowability of the resin system insufficient, and therefore it becomes difficult to mold the composition.

Incidentally, the proportion (weight ratio) of the electroconductive agent relative to the radical-polymerizable resin [the former/the latter] is about 55/45 to 95/5, preferably about 65/35 to 95/5, and more preferably about 65/35 to 95/5.

[Low Profile Additive]

The resin composition of the present invention may contain a low profile additive (or a low profile agent or a shrinkage reducing agent) in order to decrease warp, to decline contraction in connection with hardening in the shaped (or molded) article, and to improve accuracy of dimension. The radical-polymerizable thermosetting resin generally contracts upon polymerization molding, is apt to generate unevenness or warp, and is usually deteriorated in accuracy of dimension. Even in the case of using the radical-polymerizable thermosetting resin, the low profile additive ensures improvement in accuracy of dimension of the shaped article. The low profile additive may include a non-polymerizable resin, or a resin particle. These low profile additives may be used singly or in combination.

Examples of the non-polymerizable resin may include a saturated polyester-series resin (e.g., a saturated aromatic polyester-series resin such as a polyethylene terephthalate or a polybutylene terephthalate, a saturated aliphatic polyester-series resin such as a polyethylene adipate, a polybutylene adipate or a polybutylene sebacate, and a copolymerized saturated polyester-series resin having a polyoxyethylene unit), and an acrylic resin [e.g., a homo- or copolymer containing a $C_{1-10}$alkyl(meth)acrylate as a monomer component, such as a polymethyl methacrylate]. Among these low profile additives, the preferred one includes the saturated polyester-series resin (in particular, a saturated aliphatic polyester-series resin), and the acrylic resin (in particular, a homo- or copolymer containing a $C_{2-10}$alkyl acrylate as a monomer component).

The glass transition temperature of the non-polymerizable resin is not particularly limited to a specific one, and for example, may be about −50° C. to 75° C., and preferably about −20° C. to 50° C. The number average molecular weight of the non-polymerizable resin (GPC measurement method, standard substance: polystyrene) may be selected depending on the species of the radical-polymerizable resin or that of the resin system, and is not particularly limited to a specific one. The number average molecular weight is usually about 1000 to $10 \times 10^5$, preferably about 2000 to $5 \times 10^5$, and more preferably 3000 to $2 \times 10^5$.

The resin particle may comprise a thermoplastic resin or a thermosetting resin. The preferred resin particle includes a resin particle obtained from a latex or emulsion by an emulsion polymerization (hereinafter, sometimes referred to as a latex resin particle). The structure of the latex resin particle may be a monolayered structure, and is preferably a multilayered structure having a plurality of layers. The latex resin particle having the multilayered structure may be, for example, produced by a multistage emulsion polymerization described in Japanese Patent Application Laid-Open No. 48704/1996 (JP-8-48704A). The multistage emulsion polymerization may be conducted by an operation comprising a step for preparing a seed latex through an emulsion polymerization and a step for conducting seeding polymerization repeatedly at least once with adding a monomer to the seed latex. For example, a monomer is added to a seed latex to form a first layer thereon by a seeding polymerization, and further another monomer is added to the resulting latex to form a second layer thereon by a seeding polymerization. Such a seeding polymerization is sequentially and repeatedly conducted, and finally by forming an outermost layer, a desired multilayered structure particle can be obtained.

As the monomer constituting the latex resin particle, there may be used a reactive unsaturated monomer having at least one reactive unsaturated bond in a molecule thereof. The monomer may include, for example, a conjugated diene such as butadiene, isoprene or chloroprene; a $C_{1-12}$alkyl ester of an unsaturated carboxylic acid exemplified in the paragraph of the radical-polymerizable diluent (e.g., methyl(meth)acrylate, ethyl(meth)acrylate, propyl (meth)acrylate, butyl(meth)acrylate, 2-ethylhexyl (meth)acrylate, and isononyl(meth)acrylate); and a $C_{5-10}$cycloalkyl ester of an unsaturated carboxylic acid (e.g., cyclohexyl(meth)acrylate). These monomers may be used in combination with a copolymerizable monomer. For example, these monomers may be copolymerized with an aromatic vinyl compound exemplified in the paragraph of the radical-polymerizable diluent (e.g., styrene, vinyltoluene, and α-methylstyrene), a vinyl cyanide (e.g., (meth)acrylonitrile), a vinylidene cyanide, a nitrogen-containing monomer, or others. These monomers may be used singly or in combination. Among these monomers, the preferred one includes a $C_{1-4}$alkyl methacrylate such as methyl methacrylate, a $C_{1-10}$alkyl acrylate such as methyl acrylate, ethyl acrylate, butyl acrylate or 2-ethylhexyl acrylate (preferably a $C_{2-6}$alkyl acrylate such as butyl acrylate, in particular a $C_{2-4}$alkyl acrylate), and styrene.

Further, in addition to these monomers, a crosslinkable monomer and/or a graft-polymerizable monomer may be used in combination. The crosslinkable monomer may include, for example, an aromatic divinyl compound (e.g., divinylbenzene) exemplified in the paragraph of the radical-polymerizable diluent, or a $C_{2-8}$alkylene glycol unsaturated carboxylic acid ester (e.g., $C_{2-8}$alkylene glycol di(meth)acrylate), a (poly)oxyalkylene glycol unsaturated carboxylic acid ester (e.g., an oligoethylene glycol di(meth)acrylate such as diethylene glycol di(meth)acrylate), and a polyfunctional (meth)acrylate (e.g., an alkanepolyol poly(meth)acrylate such as trimethylolpropane tri(meth)acrylate). These crosslinkable monomers may be used singly or in combination. Among these monomers, a $C_{2-8}$alkylene glycol di(meth)acrylate such as butylene glycol di(meth)acrylate or hexanediol di(meth)acrylate is often used. Examples of the graft-polymerizable monomer may include an allyl ester of an unsaturated carboxylic acid, such as allyl (meth)acrylate, diallyl maleate, diallyl fumarate or diallylitaconate. These graft-polymerizable monomers may be also used singly or in combination. Among these monomers, allyl(meth)acrylate is used in many cases.

The proportion of the crosslinkable monomer and that of the graft-polymerizable monomer are about 0.1 to 10% by weight, and preferably about 0.2 to 5% by weight in the monomer constituting the polymer latex, respectively.

The outermost layer of the latex resin particle may be modified with a monomer having a carboxyl group or a hydroxyl group so that the latex particle may further improve various properties of the resin composition. The monomer having a carboxyl group may include, for example, an unsaturated carboxylic acid or an unsaturated dicarboxylic acid described in the paragraph of the radical-polymerizable diluent (e.g., acrylic acid, methacrylic acid, maleic acid, and itaconic acid). Examples of the monomer having a hydroxyl group may include a hydroxy$C_{2-6}$alkyl(meth)acrylate such as 2-hydroxyethyl (meth)acrylate, 2-hydroxypropyl(meth)acrylate or 2-hydroxybutyl(meth)acrylate. Among these monomers, (meth)acrylic acid, a hydroxy$C_{2-3}$alkyl(meth)acrylate or the like is used in many cases. From the viewpoint of dispersibility to the resin composition or physical properties of the resin composition, the proportion of the monomer having such a functional group is not more than 10% by weight and preferably not more than 5% by weight in the total monomer constituting the outmost layer.

In the latex resin particle having a multilayered structure, the proportion of the core (or an internal layer located inside of the outermost layer) relative to the outermost layer is not particularly limited to a specific one, and for example, the former/the latter (molar ratio) may be about 30/70 to 95/5, preferably about 50/50 to 90/10, and more preferably about 70/30 to 90/10.

The glass transition temperature Tg of each layer, which is determined on the basis of a monomer composition not containing a crosslinkable or graft-polymerizable monomer, may vary continuously or gradually, or irregularly. The glass transition temperature of the outermost layer may be higher or lower than that of the core (or the internal layer located inside of the outermost layer). The glass transition temperature of the outermost layer is usually higher than that of the core (or the internal layer located inside of the outermost layer). The glass transition temperature of the core (or the internal layer located inside of the outermost layer) and that of the outermost layer may be selected suitably. The glass transition temperature Tg of the core calculated on the basis of a monomer composition containing a neither crosslinkable nor graft-polymerizable monomer is usually about −54° C. to 20° C. (preferably about −50° C. to 0° C.), and that of the outermost layer may be not lower than 40° C. (e.g., about 40° C. to 80° C.) and preferably not lower than 50° C. (e.g., about 50° C. to 80° C.). Incidentally, in the outermost layer, the monomer for forming the outermost layer may contain, for example, methyl methacrylate in a proportion of not less than 50% by weight.

The average particle size of the resin particle is usually about 0.1 to 5 μm, preferably about 0.2 to 3 μm, and more preferably about 0.2 to 2 μm. Incidentally, the average particle size of the latex resin particle represents a weight-average particle size in a latex state, and may be measured based on a dynamic light scattering method by using a dynamic light scattering measuring apparatus (for example, LPA-3000/LPA-3100, manufactured by Otsuka Electronic Co., Ltd.).

The resin particle may be dispersed in the radical-polymerizable thermosetting resin system in a state of a powder, where the powder may be obtained by drying and purifying a latex polymerized by the above-mentioned method. Moreover, the resin particle in a state of the latex may be mixed in the radical-polymerizable thermosetting resin system, or may be mixed with component(s) constituting the radical-polymerizable thermosetting resin system.

As the low profile additive, other low profile additive may be used. However, since other low profile additives have a strong influence on deterioration of electroconductivity, the amount to be used thereof is stringently limited.

The proportion of the low profile additive may be, for example, about 0.1 to 15 parts by weight (e.g., about 1 to 12 parts by weight), preferably about 0.1 to 10 parts by weight (e.g., about 1 to 10 parts by weight), and more preferably 0.1 to 5 parts by weight (e.g., about 1 to 5 parts by weight), relative to 100 parts by weight of the radical-polymerizable thermosetting resin system. Incidentally, the low profile additive may be used in a proportion of about 0.1 to 30 parts by weight relative to 100 parts by weight of the radical-polymerizable thermosetting resin system. In order to lower electric resistance, it is advantageous to reduce the percentage of the low profile additive as much as possible. In the case of forming a shaped article from the resin composition containing the low profile additive, the molding shrinkage (or coefficient of contraction) of the shaped article can be reduced to not higher than 0.15%, preferably not higher than 0.1% and more preferably not higher than 0.05%, and the shaped article can improve in the dimensional accuracy.

[Curing Agent and Curing Accelerator]

The resin composition of the present invention may be easily hardened by adding a conventional curing agent (or hardening agent) used for hardening the radical-polymerizable thermosetting resin system, and if necessary, a conventional curing accelerator (promoter) (or hardening accelerator).

The curing agent may include an organic peroxide, for example, an aliphatic peroxide (e.g., methyl ethyl ketone peroxide, t-butyl peroxy-2-ethylhexanoate, di-t-butyl peroxide, and lauroyl peroxide), an aromatic peroxide (e.g., benzoylperoxide, dicumylperoxide, cumene hydroperoxide, and t-butyl peroxybenzoate), and an alicyclic peroxide (e.g., cyclohexanone peroxide). The proportion of the curing agent is about 0.1 to 5 parts by weight, preferably about 0.5 to 3 parts by weight, and more preferably about 1 to 3 parts by weight, relative to 100 parts by weight of the radical-polymerizable thermosetting resin system.

The curing accelerator may include a metal salt (e.g., a transition metal salt such as cobalt naphthenate or cobalt octanoate), an amine (e.g., a tertiary amine such as dimethylaniline or diethylaniline), acetylacetone, and the like. The proportion of the curing accelerator is about 0.01 to 3 parts by weight, preferably about 0.05 to 2 parts by weight, and more preferably about 0.1 to 2 parts by weight, relative to 100 parts by weight of the radical-polymerizable thermosetting resin system.

[Other Additives]

If necessary, to the resin composition of the present invention may be also added a conventional additive such as a filler (e.g., an aluminum hydroxide, a glass powder, a calcium carbonate, a talc, a silica, a clay, and a glass balloon), a polymerization inhibitor (e.g., hydroquinone, and t-butylcatechol), a fiber reinforcement (e.g., a glass fiber, and a carbon fiber), or a release agent (e.g., a metal soap such as calcium stearate or zinc stearate, a silicone- or fluorine-series organic compound, and a phosphoric acid-series compound).

Incidentally, the resin composition of the present invention may contain a thickening agent or a rheological agent (for example, an oxide or hydroxide of an alkaline earth metal such as magnesium or calcium, a fumed silica, a carbodiamide, an aziridine, a polyisocyanate, a polytetrafluoroethylene, a perfluoropolyether, and a polyethylene), and usually do not contain a thickening agent in many cases. There is a possibility that the addition of the thickening agent brings about deterioration in chemical resistance of the shaped article (e.g., the electroconductive plate) depending on the species of the thickening agent. In addition, as described later, the exothermic kneading is easy to cause defective molding.

[Glass Transition Temperature of Hardened Product]

In the hardened product of the radical-polymerizable thermosetting resin system comprising at least the radical-polymerizable resin (the system, that is, the radical-polymerizable resin alone; the resin composition comprising the radical-polymerizable resin, and the radical-polymerizable diluent and/or the low profile additive), the glass transition temperature thereof is preferably not lower than 120° C. (e.g., about 120° C. to 200° C., and in particular about 140° C. to 200° C.). The electroconductive plate is sometimes used at an upper temperature higher than 100° C. depending on the intended purpose (e.g., a polymer electrolyte fuel cell). Therefore the electroconductive plate (e.g., a separator) is preferably glassy and retains sufficient elasticity up to around the upper temperature.

[Molding Method of Resin Composition and Use Thereof]

The resin composition of the present invention is high in flowability and moldability, and can be molded by a conventional resin molding method. The resin molding method may include, for example, a conventional method such as casting, compression molding, or injection molding. More concretely, the resin composition may be injected or filled into a given mold, and hardened with applying heat and pressure to obtain a molded article. The heating and pressurization may be conducted at a curing temperature of the resin composition (e.g., about 70° C. to 250° C., and preferably about 100° C. to 200° C.) under a pressure of about $0.1 \times 10^6$ Pa to $50 \times 10^6$ Pa (preferably about $1 \times 10^6$ Pa to $10 \times 10^6$ Pa). The hardening (or curing) of the resin composition may be carried out in an atmosphere of an inactive gas. In particular, the radical reaction ensures to inhibit warp generation and to obtain a uniform molded article in a short time. Further, by molding through the resin molding method, a groove as a gas-passageway can be shaped precisely in the obtained molded article without any cutting process. Incidentally, in order to obtain a uniform molded article, deairing or defoaming of the resin composition may be carried out.

The resin composition may be in the form of a particulate or coarse-grained compound (or compounded matter). Such a compound (or compounded matter) may be produced by kneading the resin composition with an ordinary kneader. Moreover, the resin composition may be a viscous matter or a homogenous and clayey compound. Such a compound may be obtained by kneading the resin composition with a pressure kneader (press kneader). For example, the compound (or the electroconductive resin composition) may be prepared by kneading the electroconductive agent, the radical-polymerizable thermosetting resin system (a resin system comprising at least the radical-polymerizable resin and the radical-polymerizable diluent, preferably a resin system comprising the radical-polymerizable resin and the radical-polymerizable diluent and having no thickening agent through a pressure kneader. In particular, such a kneading ensures production of a compound being excellent in fluidity and having a homogeneous formulation even when the electroconductive agent is filled with a high concentration. Therefore, in the case of molding the compound by use of the pressure kneader, the resulting molded article has a smooth surface without unevenness, is excellent in external appearance, and has no apparent defect such as vacancy or hole. In addition, such a molded article improves in a mechanical property such as compressive strength or flexural strength. Incidentally, since the kneading through the pressure kneader or other means usually accompanies heat generation, the resin composition preferably has a formulation substantially without the thickening agent (or the rheological agent). That is, in the case where the resin composition contains a thickening agent, the reaction (thickening) inside the composition proceeds due to heat generation in kneading, and there is a possibility that the reaction contributes to molding defect.

The pressure applied by the pressure kneader is not particularly limited to a specific one as far as a homogenous compound is obtained. The pressure is about 0.1 to 10 kgf/cm$^2$ ($9.8 \times 10^3$ to $9.8 \times 10^5$ Pa), preferably about 0.3 to 8 kgf/cm$^2$, and more preferably about 0.5 to 8 kgf/cm$^2$ (in particular about 1 to 8 kgf/cm$^2$).

The blade shape of the pressure kneader may include a shape such as a Banbury type, a sigma blade, or a simplex (single curve). Among these shapes, a Banbury-type blade is preferred. The rotation number of the blade is not particularly limited to a specific one, and is about 5 to 150 rpm. The kneading temperature is not particularly limited to a specific one, and is about from a room temperature to 100° C., and preferably about from a room temperature to 80° C. (for example, about from a room temperature to 50° C.). Incidentally, the kneading step may be carried out under an appropriate atmosphere, usually in the air. Moreover, the resin composition is usually kneaded under shading.

In the present invention, the viscosity of the clayey or viscous compound produced by kneading the resin composition with the pressure kneader is about $10^2$ to $10^6$ Pa·s, preferably about $10^3$ to $10^6$ Pa·s and more preferably about $10^3$ to $10^5$ Pa·s at 25° C. (with a Helipath viscometer). Incidentally, the kneading with the pressure kneader ensures improvement in mechanical strength or thermal conductivity of the resin composition. In particular, even in the case of adding a nonconductive material (e.g., a low profile additive), the resin composition can highly retain thermal conductivity, and can be formed (or shaped) into a molded article free from apparent defect.

Moreover, in the case of molding the compound by a molding manner such as an injection molding or an injection compression molding after kneading, the suitability of the compound for the molding manner can be also evaluated by the aspect of the compound. For example, when a load is measured at which sample amount (3.5 g) of the compound starts flowing by means of an aperture (or a die, having a diameter of 1 mm and a length of 2 mm) at a temperature of 50° C. by using a flow tester (e.g., Flow Tester CFT-500 manufactured by Shimadzu Corporation), that is, the lowest load at which the flowing value becomes not larger than 0.1 mL/sec., the load is sufficient in a certain range [for example, several dozen kgf to about 1000 kgf (several hundred N to about 10000 N)]. In such a range of the load, a good molded article can be obtained by the molding manner (e.g., an injection molding). Incidentally, when a load at which the compound starts flowing is over the above-mentioned range, it is difficult to weigh the compound by the injection molding machine. On the other hand, in the case where a load at which the compound starts flowing is below the above range, it is difficult to give a stable and uniform molded article.

In particular, in the compound substantially without any thickening agents, it is preferred to flow the compound at a load of about 30 to 1000 kgf (about 300 to 10000 N), preferably about 40 to 850 kgf (about 400 to 8500 N), and more preferably 50 to 700 kgf (about 500 to 7000 N). The use of such a compound ensures to obtain a good molded article even in the case of substantially without any thickening agents which are conventionally essential. Moreover, there is no deterioration of property to be required due to addition of the thickening agent component, and as a result, excellent properties of the resulting molded article, in particular chemical resistance (acid resistance), can be retained.

The hardened product of the resin composition of the present invention expresses gas impermeability, stability for warm (hot) water, acid resistance (sulfuric acid resistance) and a high mechanical strength, in addition, an especially low electric resistance, and can be conveniently molded by the resin molding method. The hardened product can be therefore used for a variety of application such as electric or electronic parts. In the preferred embodiment, the hardened product of the resin composition is useful as an electroconductive plate, in particular a separator for a fuel cell (a polymer electrolyte fuel cell provided with a solid polymer electrolytic membrane in chief).

The electric resistance (or the volume resistivity in the thick direction) of the hardened product (in particular, an electroconductive plate such as a separator for a fuel cell) is not higher than 30 mΩ·cm (e.g., about 1 to 30 mΩ·cm), for example, about 1 to 20 mΩ·cm, preferably about 1 to 15 mΩ·cm, and more preferably about 1 to 10 mΩ·cm (e.g., about 1 to 5 mΩ·cm).

The electroconductive plate (e.g., the separator) is usually in the form of a plate, and has a groove [one or a plurality of groove(s)] as a gas passage for feeding a hydrogen gas or an oxidizing gas (an oxygen-containing gas such as oxygen). The thickness of the electroconductive plate (or the separator) may be about 1 to 10 mm (in particular about 2 to 5 mm).

INDUSTRIAL APPLICABILITY

Since the hardened molded article formed from the present electroconductive resin composition is able to fill the electroconductive agent therein in a high proportion, and the hardened molded article exhibits high conductivity. Further, the hardened molded article also has a low electric resistance, a high mechanical strength, a low gas permeability, a high durability (in particular stability for warm (hot) water, or acid resistance such as sulfuric acid resistance) and a high dimensional accuracy. Moreover, the resin composition of the invention is applicable to the resin molding method, and is a compound excellent in fluidity, resulting in having an excellent moldability. Therefore, the resin composition of the invention is suitable for an electroconductive plate, for example, a separator material for a fuel cell (particularly a polymer electrolyte fuel cell).

EXAMPLES

The following examples are intended to describe this invention in further detail and should by no means be interpreted as defining the scope of the invention. Incidentally, methods for synthesizing each of components used in Examples and details of these components, and methods for evaluating physical properties of obtained flat plates are shown as follows.

[Radical-Polymerizable Resin Composition]

Synthesis Example 1

Unsaturated Polyester Resin Composition "A"

Diethylene glycol (2910 g), fumaric acid (500 g), adipic acid (1050 g), and isophthalic acid (2429 g) were allowed to react in accordance with a conventional method until the acid value became 15 mgKOH/g at a reaction temperature of 200° C., and an unsaturated polyester resin was prepared. With 100 parts by weight of the unsaturated polyester resin were mixed 70 parts by weight of styrene to give an unsaturated polyester resin composition "A" having an acid value of 8.8 mgKOH/g.

Synthesis Example 2

Unsaturated Polyester Resin Composition "B"

Propylene glycol (5010 g) and isophthalic acid (6250 g) were allowed to primarily react based on a conventional manner until the acid value became 15 mgKOH/g at a reaction temperature of 200° C. Then, propylene glycol (2320 g) and maleic anhydride (5530 g) were added to the reaction product, and the mixture was allowed to react in accordance with a conventional method until the acid value became 20 mgKOH/g at a reaction temperature of 200° C., and an unsaturated polyester resin was prepared. With 100 parts by weight of the unsaturated polyester resin were mixed 70 parts by weight of styrene to give an unsaturated polyester resin composition "B" having an acid value of 11.7 mgKOH/g.

Synthesis Example 3

Vinyl Ester Resin Composition "C"

In a four-neck flask equipped with a stirrer, a cooling pipe, a nitrogen-inlet device and a thermometer were charged 374 g of bisphenol A-based epoxy resin (EPOTOTO YD 128 manufactured by Toto Kasei Co., Ltd., epoxy equivalent: 187 g/eq), 172 g of methacrylic acid, 0.2 g of triphenylphosphine and 0.1 g of hydroquinone, and the mixture was allowed to react for 8 hours at 120° C. to obtain a vinyl ester resin (546 g) having an acid value of 1.8 mgKOH/g. The vinyl ester resin was diluted with 364 g of styrene to give a vinyl ester resin composition "C" having an acid value of 1.1 mgKOH/g.

[Radical-Polymerizable Diluent]

MAA: Methacrylic Acid

Acrylic monomer "D": BISCOAT#700 manufactured by Osaka Organic Chemical Industry Ltd. (an acryl monomer which is a compound represented by the formula (1), where both $R^1$ and $R^2$ are methyl groups, $R^3$ is ethylene group, $R^4$ is hydrogen atom, "n" is 2 and "m" is 0)

SM: Styrene

[Low Profile Additive]

Synthesis Example 4

Saturated Polyester Resin "E"

In a five-neck flask (1 L) provided with a stirrer, a thermometer, a nitrogen-inlet tube and a partial reflux condenser equipped with a thermometer in a top region thereof were charged 438 g of adipic acid, 96 g of propylene glycol, and 117 g of ethylene glycol. The inside air of the flask was replaced with nitrogen, and the mixture was subjected to a dehydration condensation at 200° C. for 8 hours to give a saturated polyester resin "E" having an acid value of 4.6 mgKOH/g. The glass transition temperature (Tg) of the resin was 42° C.

Synthesis Example 5

Polymer Fine Particle "F" having Multilayered Structure

In a 2-liter polymerization vessel equipped with a reflux condenser was charged deionized water (506 g), 1% by weight aqueous solution (2.4 g) of sodium dioctylsulfosuccinate, and 1% by weight aqueous solution (16.4 g) of sodium hydrogen carbonate. The mixture was heated to 70° C. with stirring under a nitrogen flow. After heating, ethyl acrylate (8 g) was added to the mixture, and stirred for 10 minutes. Then, 2% by weight aqueous solution (4.1 g) of sodium persulfate was added to the resulting mixture, and stirred for further 1 hour to give a seed latex.

Consecutively, 2% by weight aqueous solution (51 g) of sodium persulfate was added to the seed latex at 70° C., and then to the resulting latex was continuously fed a monomer emulsion for forming a first layer over 240 minutes. The monomer emulsion contained butylacrylate (663 g), 1,4-butylene glycol diacrylate (2.4 g), allyl methacrylate (6.7 g), 1% by weight aqueous solution (408 g) of sodium dioctylsulfosuccinate, and 1% by weight aqueous solution (68 g) of sodium hydrogen carbonate. After completion of the feeding, the resulting product was further stirred at 70° C. for 60 minutes for aging.

Next, to the product was added 2% by weight aqueous solution (7.2 g) of sodium persulfate while the temperature was maintained at 70° C. Then, to the resulting latex was continuously fed a monomer emulsion for forming an outermost layer over 90 minutes. The monomer emulsion contained methyl methacrylate (101 g), ethyl acrylate (12 g), 2-hydroxyethyl methacrylate (0.6 g), 1,4-butylene glycol diacrylate (6 g), 1% by weight aqueous solution (60 g) of sodium dioctylsulfosuccinate, and 1% by weight aqueous solution (12 g) of sodium hydrogen carbonate. After completion of the feeding, the mixture was heated to 80° C., and stirred for further 60 minutes for an aging reaction. After completion of the aging reaction, the reaction product was filtered by using a 300 mesh stainless-steel metal gauze to give a polymer latex having a multilayered structure and a weight-average particle size of 0.5 μm. The latex was once allowed to freeze at −30° C. Then, the frozen latex was melted, and dehydrated and washed by a centrifugal dehydrator. The resulting matter was further dried at 40° C. by ventilation for a day and night to give a resin particle "F" having a multilayered structure.

Synthesis Example 6

Vinyl Ester Resin Composition "J"

In a four-neck flask equipped with a stirrer, a cooling pipe, a nitrogen-inlet device, and a thermometer were charged 1057 g of bisphenol A-based epoxy resin, 140 g of methacrylic acid, 2.39 g of triphenyl phosphine, and 1.80 g of hydroquinone, where the bisphenol A-based epoxy resin was EPOTOTO YD 012 (manufactured by Toto Kasei Co., Ltd.) having an epoxy equivalent of 647.6 g/eq, in which and a proportion (weight ratio) of a bisphenol A-based epoxy resin corresponding to the repeating number "k" of a bisphenol skeleton of 0 (that is, diglycidyl ether of bisphenol A) relative to a bisphenol A-based epoxy resin corresponding to a repeating number "k" of a bisphenol skeleton of not less than 4 [the former/the latter] was 8/92. The mixture was allowed to react for 12 hours at 120° C. to give 1200 g of a vinyl ester resin having an acid value of 2.0 mgKOH/g. The vinyl ester resin was diluted with 800 g of styrene to obtain a vinyl ester resin composition "J" having an acid value of 1.2 mgKOH/g.

Synthesis Example 7

Vinyl Ester Resin Composition "K"

In a four-neck flask equipped with a stirrer, a cooling pipe, a nitrogen-inlet device, and a thermometer were charged 1013 g of a bisphenol A-based epoxy resin, 184 g of methacrylic acid, 3.00 g of triphenyl phosphine, and 1.80 g of hydroquinone, where the bisphenol A-based epoxy resin was EPOTOTO YD 7011 (manufactured by Toto Kasei Co., Ltd.) having an epoxy equivalent of 474.8 g/eq, in which a proportion (weight ratio) of a bisphenol A-based epoxy resin corresponding to the repeating number "k" of a bisphenol skeleton of 0 (that is, diglycidyl ether of bisphenol A) relative to a bisphenol A-based epoxy resin corresponding to the repeating number "k" of a bisphenol skeleton of not less than 4 [the former/the latter] was 12/88. The mixture was allowed to react for 12 hours at 120° C. to give 1200 g of a vinyl ester resin having an acid value of 2.2 mgKOH/g. The vinyl ester resin was diluted with 800 g of styrene to obtain a vinyl ester resin composition "K" having an acid value of 1.3 mgKOH/g.

[Polymerization Initiator and Electroconductive Agent]

Polymerization initiator: TBPB (t-butyl peroxybenzoate) manufactured by NOF Corporation Electroconductive agent "G": SGP50 manufactured by SEC Corporation (artificial graphite powder having an average particle size of 50 μm)

Electroconductive agent "H": SGP100 manufactured by SEC Corporation (artificial graphite powder having an average particle size of 100 μm)

Electroconductive agent "I": ThermoCarb. 300 manufactured by Conoco Carbon Fibers (artificial graphite powder having an average particle size of 300 μm)

[Evaluation Method of Physical Property]

(Electric Resistance)

The volume resistivity in the penetrating direction was determined as follows. Several flat plates (each plate having 50 mm long, 50 mm wide and about 2 mm thick) disposed in layers were held between electrodes each made of a gilded copper plate, and the resistance between the gilded electrodes was measured under applying a load (2 MPa) (unit: mΩ·cm). The volume resistivity in the penetrating direction was calculated based on the following formula:

$$\text{Volume resistivity in penetrating direction} = (A-B) \times S / [(m-n) \times t]$$

wherein "A" represents a resistance value of m-ply plates (i.e., the number of flat plates in layers is "m"), "B" represents a value of resistance of n-ply plates (i.e., the number of flat plates in layers is "n"), "S" shows an area of a flat plate, "t" shows a thickness of a flat plate. Incidentally, m=4, and n=2.

(Flexural Strength)

The flexural (or bending) strength was determined in accordance with of three point loading method (JIS (Japanese Industrial Standards) K 7203) (unit: MPa).

(Deflection Rate)

The deflection rate was measured based on JIS K 7203 (unit: %).

(Thermal Conductivity)

Two flat plates (50 mm long, 50 mm wide and 10 mm thick per plate) were put one on top the other, and the thermal conductivity (heat conductivity) was measured at 23° C. with a thermal property measurement apparatus (TPA-501 type, manufactured by Kyoto Electronics Manufacturing Co., Ltd.), on the basis of Hot Disk method (a method using a planate heat source) (a method for determining thermal conductivity by relatively comparing a subject material with an international standard material of NIST (US)) (unit: W/(m·K)). Incidentally, the average of three measurements was shown.

(Gas Permeability)

The gas permeability was measured by using pure hydrogen gas and was represented by the following formula (unit: cm²/sec·atm):

$$\text{Hydrogen gas permeability} = [(\text{Permeated amount of hydrogen gas}) \times (\text{Thickness of sample})] / [(\text{Time}) \times (\text{Cross section}) \times (\text{Differential pressure})] (\text{Stability for warm (hot) water})$$

A flat plate was immersed for 2000 hours in hot water (90° C.). Thereafter, the plate was dried at 110° C. for 24 hours. The flexural strengths and weights before and after the immersing were measured to determine the retention rate of the flexural strength and the retention rate of the weight based on the following formulae.

$$\text{Retention rate of flexural strength (\%)} = [(\text{Flexural strength at } 23° \text{ C. after immersion})/(\text{Initial flexural strength at } 23° \text{ C.})] \times 100$$

$$\text{Retention rate of weight (\%)} = [(\text{Weight of flat plate after immersion})/(\text{Initial weight of flat plate})] \times 100$$

(Molding Shrinkage (Linear))

The molding shrinkage (linear) of a flat plate relative to a mold (300 mm×300 mm×5 mm) for the plate was measured.

(Warp)

Each flat plate (300 mm×300 mm×1 mm) was allowed to stand for one day under conditions of 23° C. and 50% RH. All of the flat plates had thickness errors of not more than 0.1 mm. Each flat plate was disposed on a flat surface of a glass plate so that the central of 300 mm squares of the flat plate was contacted with the glass plate. The distance (mm) between the flat plate and the glass plate was measured at each of four corners (vertices) of. The warp was shown as the average of the distances in the four corners.

Examples 1 to 7 and Comparative Examples 1 to 3

In each of Examples and Comparative Examples, resin compositions "A" to "C", "J" and "K" each containing a radical-polymerizable diluent, the low profile additive (the saturated polyester resin "E" or the polymer fine particle "F"), and the radical-polymerizable diluent were mixed in a proportion shown in Table 1 to prepare resin compositions. Then, the electroconductive agent and the polymerization initiator were added in a proportion shown in Table 1 to the resin compositions. The resulting mixture was kneaded at 40° C. and 50 rpm under a pressure of 3.92×10⁵ Pa (4 kgf/cm²) by using a pressure kneader (THM 0.5-3M, manufactured by Toshin Co., Ltd.). Thereafter, the kneaded compound was cured in a flat mold (300 mm×300 mm×8 mm) at 150° C. for 2 minutes under a pressure of 4.9×10⁶ Pa (50 kgf/cm²) to shape a flat plate. The properties of the flat plate were evaluated, and the results were shown in Table 1.

TABLE 1

| | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| Resin composition A (parts by weight) | — | — | — | — | — | — | — | 168.5 | — | — |
| Resin composition B (parts by weight) | 163.5 | — | — | — | 156.5 | — | — | — | 168.5 | — |
| Resin composition C (parts by weight) | — | 158.5 | 128 | 143.5 | — | — | — | — | — | 125 |
| Resin composition J (parts by weight) | — | — | — | — | — | 61.5 | — | — | — | — |
| Resin composition K (parts by weight) | — | — | — | — | — | 60 | 126.5 | — | — | — |
| Methacrylic acid (parts by weight) | 5 | 10 | 15 | 5 | 5 | 10 | 5 | — | — | 25 |
| Acrylic monomer D (parts by weight) | — | — | — | 20 | — | — | — | — | — | — |
| SM (parts by weight) | — | — | 2 | — | 2 | — | — | — | — | — |
| Acid value of resin system (mgKOH/g) | 30.6 | 39.7 | 66.0 | 20.4 | 30.4 | 39.7 | 30.6 | 8.8 | 11.7 | 97.6 |
| Saturated polyester E (parts by weight) | — | — | — | — | 5 | — | — | — | — | — |
| Resin particle F (parts by weight) | — | — | 5 | — | — | — | — | — | — | — |
| Polymerization initiator (parts by weight) | 2.5 | 2.5 | 2.5 | 2.5 | 2.5 | 2.5 | 2.5 | 2.5 | 2.5 | 2.5 |
| Electroconductive agent G (parts by weight) | 187.5 | 187.5 | — | 187.5 | 187.5 | — | — | 187.5 | 187.5 | 400 |
| Electroconductive agent H (parts by weight) | 393.5 | 393.5 | — | 393.5 | 393.5 | — | — | 393.5 | 393.5 | 200 |
| Electroconductive agent I (parts by weight) | — | — | 600 | — | — | 618.5 | 618.5 | — | — | — |
| Electric resistance (m Ω · cm) | 13.9 | 10.6 | 8.6 | 9.4 | 14.1 | 3.6 | 4.3 | 32.6 | 23.6 | 13.4 |
| Flexural strength (MPa) | 32.9 | 41.7 | 38.9 | 45.1 | 35.1 | 38.6 | 40.4 | 33.1 | 34.2 | 27.5 |
| Deflection rate (%) | 0.4 | 0.6 | 0.4 | 0.6 | 0.5 | 0.43 | 0.4 | 0.4 | 0.5 | 0.6 |
| Glass transition temperature (° C.) | 168 | 177 | 174 | 180 | 165 | 135 | 144 | 165 | 161 | 156 |
| Thermal conductivity (W/(m · K)) | 32 | 32 | 36 | 33 | 32 | 33 | 33 | 33 | 32 | 36 |
| Solid content (%) | 77.5 | 77.5 | 80 | 77.5 | 77.5 | 82.5 | 82.5 | 77.5 | 77.5 | 80 |
| Gas permeability (cm$^2$/sec · atm) | <$10^{-10}$ | <$10^{-10}$ | <$10^{-10}$ | <$10^{-10}$ | <$10^{-10}$ | <$10^{-10}$ | <$10^{-10}$ | <$10^{-10}$ | <$10^{-10}$ | <$10^{-10}$ |
| Retention rate of flexural strength after immersion (%) | 99< | 99< | 99< | 99< | 99< | 99< | 99< | 99< | 99< | 94 |
| Retention rate of weight after immersion (%) | 99< | 99< | 99< | 99< | 99< | 99< | 99< | 99< | 99< | 97 |
| Molding shrinkage (%) | 0.20 | 0.17 | 0.10 | 0.18 | 0.09 | 0.12 | 0.13 | 0.26 | 0.24 | 0.18 |
| Warp (mm) | 16.6 | 15.8 | 7.0 | 14.9 | 6.6 | 12.8 | 13.5 | 20.8 | 19.1 | 15.9 |

As apparent from the results shown in Table 1, in each of Examples the flat plate has a low electric resistance, and in addition, is excellent in mechanical strength, stability for warm (hot) water and others. On the contrary, the flat plates of Comparative Examples 1 and 2, each having a low acid value, are high in electric resistance and cause a large warp and contraction in spite of adding the electroconductive agent similar to Examples. Moreover, the flat plate of Comparative Example 3, having a high acid value is low in stability for warm (hot) water.

The invention claimed is:

1. An electroconductive plate comprising a hardened product of a resin composition which comprises an electroconductive agent and a radical-polymerizable thermosetting resin system, wherein (i) the plate is a separator for a fuel cell;
(ii) the radical-polymerizable thermosetting resin system has an acid value of 15 to 95 mgKOH/g;
(iii) the electroconductive agent comprises a carbon powder;
(iv) the radical-polymerizable thermosetting resin system at least comprises a radical-polymerizable resin and a radical-polymerizable diluent;
(v) the radical-polymerizable resin or the radical-polymerizable diluent comprises a polymerizable unsaturated carboxylic acid; and
(vi) the radical-polymerizable diluent comprises an aromatic vinyl compound.

2. A plate according to claim 1, wherein the weight retention rate of the plate after immersion in 90° C. hot water for 2000 hours is not less than 98% relative to that before immersion.

3. A plate according to claim 1, wherein the retention rate of flexural strength of the plate after immersion in 90° C. hot water for 2000 hours is not less than 95% relative to that before immersion.

4. A process for producing an electroconductive plate recited in claim 1, which comprises forming a resin composition recited in claim 1 by a resin molding method.

5. A process according to claim 4, wherein the resin molding method comprises kneading an electroconductive agent and a radical-polymerizable thermo setting resin system recited in claim 1 by a pressure kneader to prepare a compounded matter, and molding the compounded matter to obtain the plate.

6. A plate according to claim 1, wherein the radical-polymerizable thermosetting resin system has an acid value of 20 to 80 mgKOH/g.

7. A plate according to claim 1, wherein the radical-polymerizable resin comprises at least one member selected from the group consisting of an unsaturated polyester-series resin and a vinyl ester resin.

8. A plate according to claim 1, wherein the radical-polymerizable resin comprises a vinyl ester resin represented by the following formula (a):

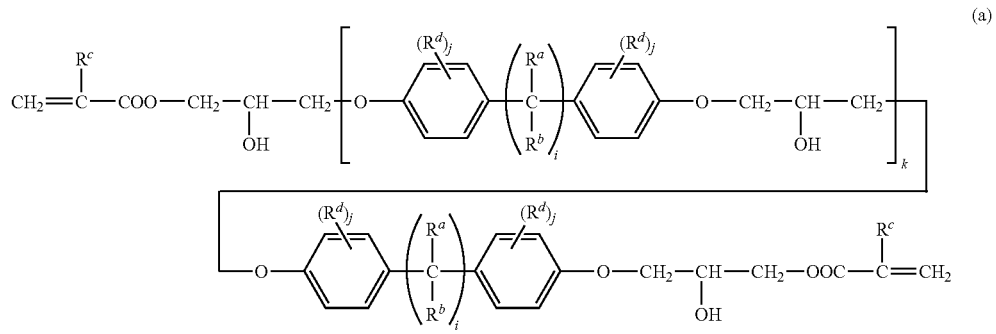

wherein $R^a$ and $R^b$ are the same or different and each represents a hydrogen atom or an alkyl group, $R^c$ represents a hydrogen atom or methyl group, $R^d$ represents a $C_{1-3}$ alkyl group, i denotes 0 or 1, j denotes an integer of 0 to 4, and k denotes 0 or an integer of not less than 1; and the vinyl ester resin comprises a plurality of resin components different in the number of k in the formula (a), and the proportion (weight ratio) of the resin component in which k is 0 or 1 relative to the resin component in which k is not less than 4 is 95/5 to 5/95.

9. A plate according to claim 1, wherein the radical-polymerizable resin has a double bond equivalent in the range from 200 to 1000.

10. A plate according to claim 1, wherein the proportion of the aromatic vinyl compound is 5 to 60% by weight in the radical-polymerizable thermosetting resin system.

11. A plate according to claim 1, wherein the radical-polymerizable diluent comprises a compound represented by the following formula (1):

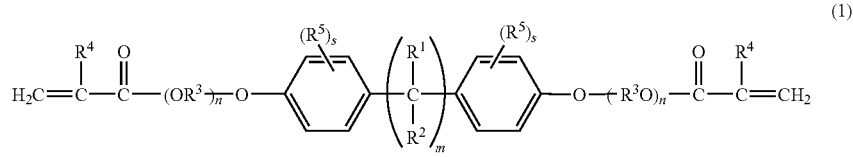

wherein $R^1$ and $R^2$ represents a hydrogen atom or a $C_{1-3}$ alkyl group, $R^3$ represents a $C_{2-4}$ alkylene group, $R^4$ represents a hydrogen atom or methyl group, $R^5$ represents a $C_{1-3}$ alkyl group, n denotes an integer of 0 to 5, m denotes 0 or 1, and s denotes an integer of 0 to 4.

12. A plate according to claim 11, wherein, in the formula (1), m is 1 and n denotes an integer of 1 to 5.

13. A plate according to claim 1, wherein the resin composition further comprises a low profile additive.

14. A plate according to claim 13, wherein the low profile additive is in the form of a resin particle.

15. A plate according to claim 13, wherein the low profile additive comprises at least one member selected from the group consisting of a saturated polyester-series resin, an acrylic resin and a multilayer resin particle.

16. A plate according to claim 1, wherein a hardened product of the radical-polymerizable thermosetting resin system has a glass transition temperature of not lower than 120° C.

17. A plate according to claim 1, wherein the proportion (weight ratio) of the electroconductive agent relative to the radical-polymerizable thermosetting resin system is 55/45 to 95/5.

* * * * *